United States Patent [19]

Young

[11] E Patent Number: Re. 33,675

[45] Reissued Date of Patent: Aug. 27, 1991

[54] MOTORIZED WHEEL CHAIR

[75] Inventor: Alva L. Young, Tulsa, Okla.

[73] Assignee: Sinties Corporation, Tulsa, Okla.

[21] Appl. No.: 307,790

[22] Filed: Feb. 7, 1989

Related U.S. Patent Documents

Reissue of:

[64] Patent No.: 4,641,720
Issued: Feb. 10, 1987
Appl. No.: 709,766
Filed: Mar. 8, 1985

[51] Int. Cl.[5] ..... B62D 11/08; B60K 28/00

[52] U.S. Cl. ..... 180/167; 180/169; 180/216; 180/342; 180/907; 180/6.2

[58] Field of Search ..... 180/6.2, 6.24, 6.26, 180/216, 907, 279, 214, 274, 74, 907, 275, 276, 277, 278, 280, 11, 16, 199, 342, 216, 169, 167; 446/175

[56] References Cited

U.S. PATENT DOCUMENTS

| | | | |
|---|---|---|---|
| 2,586,273 | 2/1952 | Steven | 180/27 |
| 2,836,253 | 5/1958 | Lovell | 446/175 |
| 3,195,674 | 7/1965 | Schmidt | 180/275 |
| 3,506,080 | 4/1970 | Hott et al. | 180/214 |
| 3,513,931 | 5/1970 | Warner et al. | 180/169 |
| 3,664,450 | 5/1972 | Udden et al. | 180/907 |
| 4,020,918 | 5/1977 | Housekamp et al. | 180/279 |
| 4,274,503 | 6/1981 | Mackintosh | 180/23 |
| 4,341,278 | 7/1982 | Meyer | 180/79.1 |
| 4,407,393 | 10/1983 | Youdin et al. | 180/167 |
| 4,425,535 | 1/1984 | Kamimoto | 318/264 |
| 4,546,840 | 10/1985 | Yukishige et al. | 180/279 |
| 4,566,707 | 1/1986 | Nitzberg | 180/8.2 |
| 4,674,584 | 6/1987 | Watkins | 180/8.2 |
| 4,729,447 | 3/1988 | Morse | 180/65.1 |

FOREIGN PATENT DOCUMENTS

| | | | |
|---|---|---|---|
| 677816 | 6/1939 | Fed. Rep. of Germany | 180/216 |
| 2724553 | 12/1978 | Fed. Rep. of Germany | 180/907 |
| 3128112 | 2/1983 | Fed. Rep. of Germany | 180/907 |
| 1204349 | 9/1960 | France | 180/74 |
| 1129915 | 10/1968 | United Kingdom | 180/279 |

*Primary Examiner*—Richard A. Bertsch
*Attorney, Agent, or Firm*—Bill D. McCarthy; Glen M. Burdick

[57] ABSTRACT

A motorized wheel chair is provided comprising a chassis having two rear wheels and one front wheel mounted thereon. The front wheel is steerable by a handlebar. The rear wheels are driven by an electric motor, coupled to a gearbox, for reducing the speed of the wheel chair. The gearbox drives a friction drive assembly which is engageable with the rear wheels and also is coupled to the handlebar such that one of the rear wheels will be disengaged depending upon which direction the handlebar is turned. The device is provided with a switch which cuts power to the device when a change in surface elevation of a desired amount is detected either in front of or behind the device. A second switch may be provided to stop the vehicle upon contact with a foreign object. A third switch may be activated remotely to stop the device. Also, the chassis is adjustable in length, such that as a child grows the device may be adjusted accordingly.

11 Claims, 3 Drawing Sheets

MOTORIZED WHEEL CHAIR

Matter enclosed in heavy brackets [ ] appears in the original patent but forms no part of this reissue specification; matter printed in italics indicates the additions made by reissue.

BACKGROUND OF THE INVENTION

1. Field of Invention

This invention relates generally to motorized wheel chairs. More particularly, this invention relates to motorized wheel chairs suitable for use by small children.

2. Prior Art

Many devices have been designed and are now in use which aid the physically or mentally challenged in moving from place to place. Various motorized wheel chairs are now available for such use. However, these devices are often unsuitable for use by small children.

In order to provide a motorized wheel chair for small children, especially those under five years of age, additional factors must be taken into consideration. In order to circumvent the requirement of constant adult supervision, the vehicle must incorporate a number of safety features. A child must not be able to operate the vehicle across sharp changes in floor elevation (e.g. steps). The vehicle should operate at a very low speed and must be easy to steer. Some protection should be provided to prevent damage to furniture and other household fixtures. The vehicle must resist overturning. It is also desirable that a supervising adult be provided with some remote means for immediately stopping the vehicle.

There are very few devices currently available which meet any of the above criteria. This problem is compounded by the fact that devices currently on the market are extremely expensive. Also, current motorized wheel chairs for small children are useless when the children outgrow them, thus requiring even greater costs for replacement vehicles.

SUMMARY OF THE INVENTION

Considering the above, it is an object of this invention to provide a motorized wheel chair which is suitable for operation by small children.

It is another object of this invention to provide a motorized wheel chair which cannot be operated across sharp changes in elevation.

It is still another object of this invention to provide a motorized wheel chair which will operate at a low speed and which is easily steerable.

It is a further object of this invention to provide a motorized wheel chair which incorporates a feature to prevent damage to furniture and other household fixtures.

It is still a further object of this invention to provide a motorized wheel chair which is provided with a remote stopping means.

It is still another object of this invention to provide a motorized wheel chair which is relatively inexpensive and is adaptable for operation as a child grows.

Still other objects and advantages of this invention shall become apparent from the ensuring descriptions of the invention.

A motorized wheel chair is provided comprising a chassis having two rear wheels and one front wheel mounted thereon. The front wheel is steerable by a handlebar. The rear wheels are driven by an electric motor, coupled to a gearbox, for reducing the speed of the wheel chair. The gearbox drives a friction drive assembly which is engageable with the rear wheels and also is coupled to the handlebar such that one of the rear wheels will be disengaged depending upon which direction the handlebar is turned. The device is provided with a switch which cuts power to the device when a change in surface elevation of a desired amount is detected either in front of or behind the device. A second switch may be provided to stop the vehicle upon contact with another object. A third switch may be activated remotely to stop the device. Also, the chassis is adjustable in length, such that as a child grows the device may be adjusted accordingly.

DESCRIPTION OF PREFERRED EMBODIMENTS OF THE INVENTION

Figure 1:
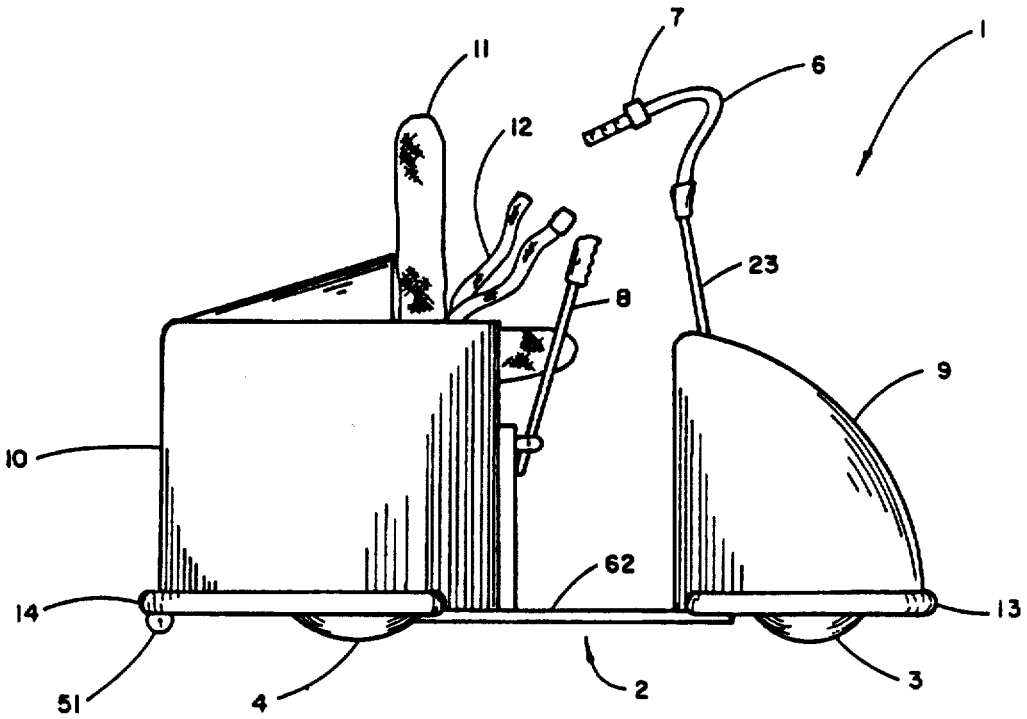
FIG. 1 is a side view of a preferred embodiment of the invention.
Figure 2:
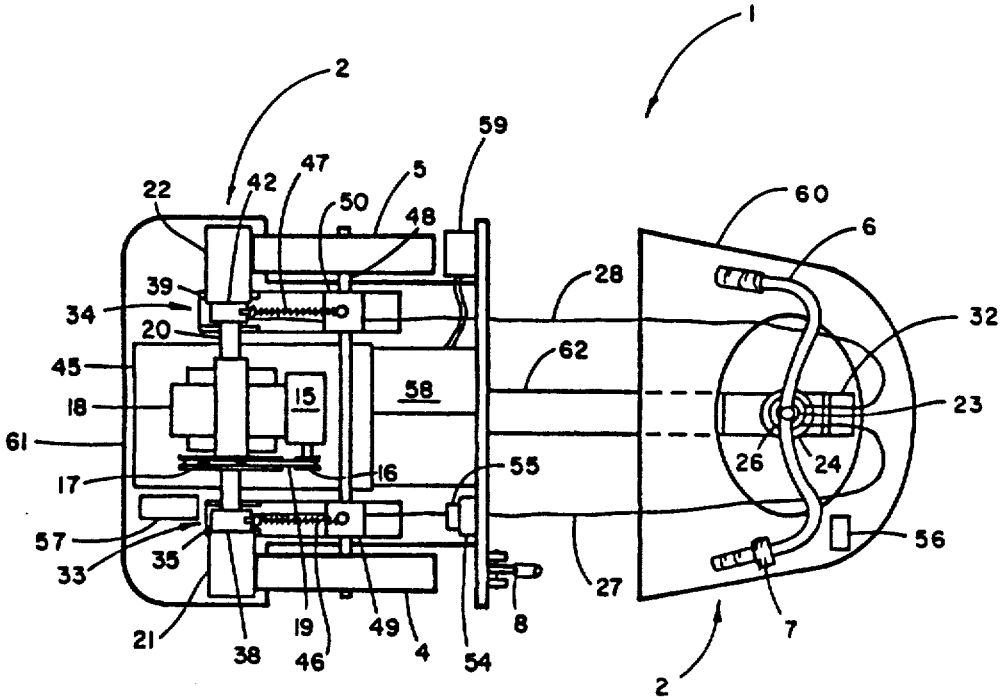
FIG. 2 is a top view of a preferred embodiment of the invention with the outer coverings and right rear wheel removed.

As shown in FIGS. 1 and 2, the vehicle 1 generally comprises a chassis 2, on which are mounted a front wheel 3, a right rear wheel 4 and a left rear wheel 5. As can be seen, the wheels 3, 4 and 5 are located within the outer perimeter of the vehicle. This arrangement complements the sensory equipment on the vehicle, which will be described in further detail herein, and reduces the likelihood of wheel contact with foreign objects. The vehicle 1 can be steered by a steering means 6, which is usually a handlebar, as shown in the Figures. The handlebar 6 is provided with a handlebar post 23, which passes through a front bearing assembly 24 in chassis 2 and connects to front forks 25. In a preferred embodiment, handlebar post 23 is removable and replaceable with an eating tray, learning aids, a desk top or other such items. A throttle 7 is provided for speed control. The throttle 7 may assume various forms known in the art. In the Figures, the throttle 7 is shown in the form of a twist grip. A shift lever 8 is provided to enable the operator to shift between forward and reverse. Sterring means 6, throttle 7 and shift lever 8 could be combined electronically into a joy stick control such that all vehicle movements could be controlled by a single component, actuated by a single hand or head movement by the operator. A front covering 9 and a rear covering 10 encase the internal workings of the vehicle. It is preferable that coverings 9 and 10 be lockable to prevent tampering and promote safety. A seat 11 is provided for the operator. In order to assure a tight turning radius, it is preferred that rear wheels 4 and 5 be located generally beneath the seat 11. Safety belts 12 may be provided to hold the operator in place. A front bumper 13 and a rear bumper 14 are provided to encase the perimeter of front covering 9 and rear covering 10, respectively. The bumpers 13 and 14 will also serve complement the sensory equipment on the vehicle 1.

One separate requirement for the vehicle 1 is that it must travel at a slow rate to permit proper supervision of the child and to prevent accidents.

Figure 3:
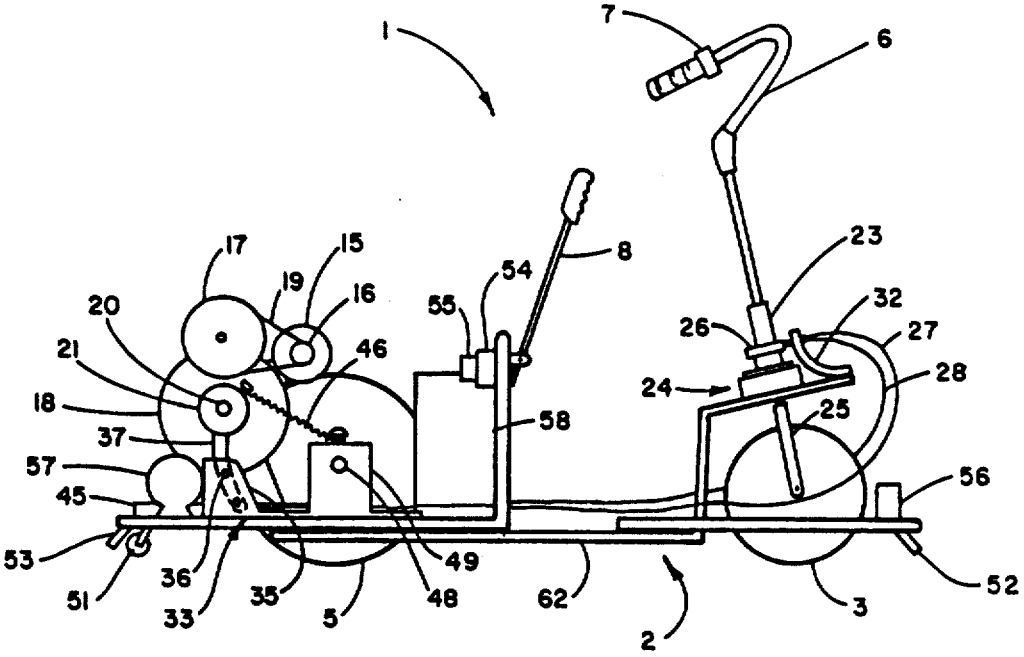
FIG. 3 is a side view of a preferred embodiment of the invention with the outer coverings removed.
Figure 4:
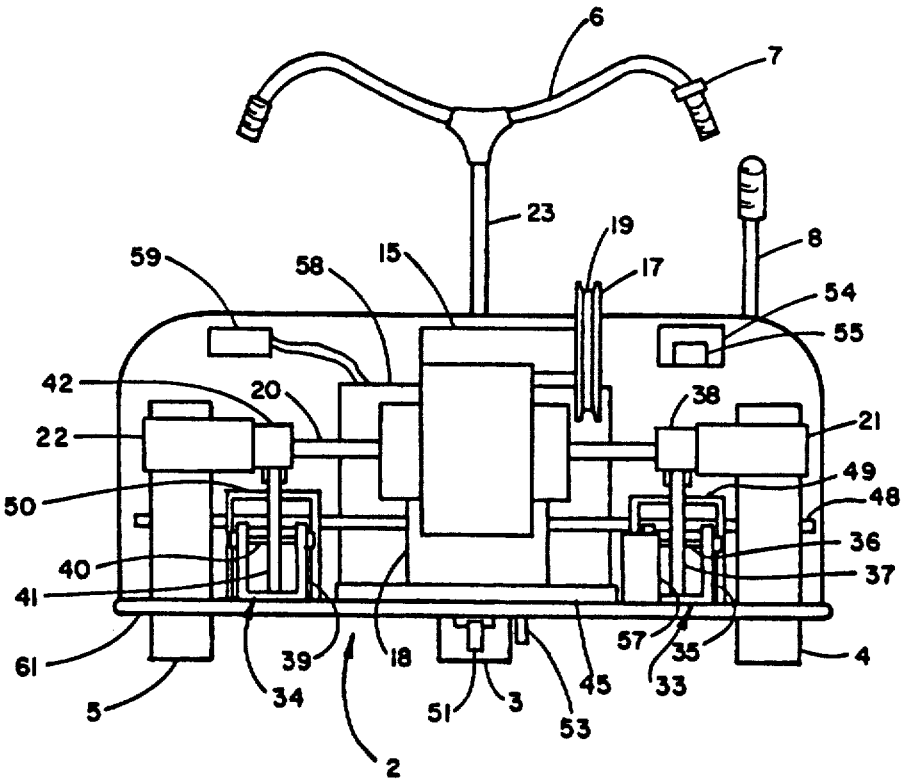
FIG. 4 is a rear view of a preferred embodiment of the invention with the outer coverings removed.

The vehicle is powered by an electric motor 15. Electrical wiring has been omitted for clarity. It will be understood that shift lever 8, throttle 7, motor 15, front elevation sensing means 52, rear elevation sensing means 53, remote switching means 55 front object detection means 56, rear object detection means 57 and battery system 58 are connected to circuit box 54 by means known in the art so as to perform their respective functions. In order to provide the reduction in speed, various means may be employed. As shown in FIGS. 2–4, a small pulley 16, rotatably connected to motor 15, drives a large pulley 17 which is connected to a gear reduction means 18, usually a gearbox. The pulleys are driven by means of a belt 19. The gearbox 18 drives drive shaft 20 at a greatly reduced rate of rotation compared to that of small pulley 16.

Figure 5:
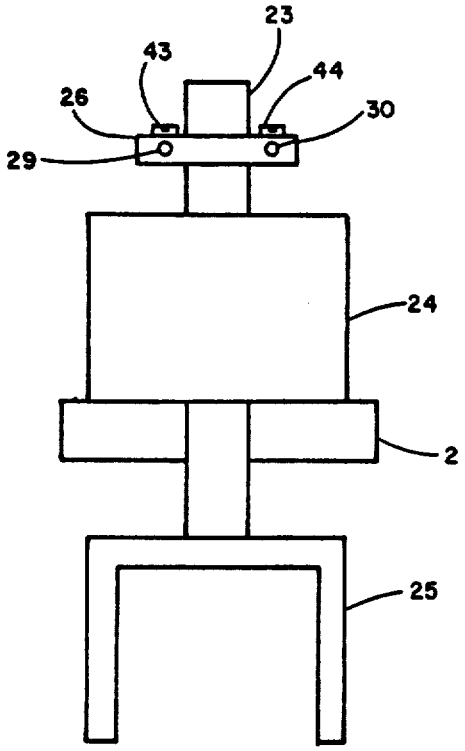
FIG. 5 is a front view of a preferred embodiment of the front steering mechanism of the invention.
Figure 6:
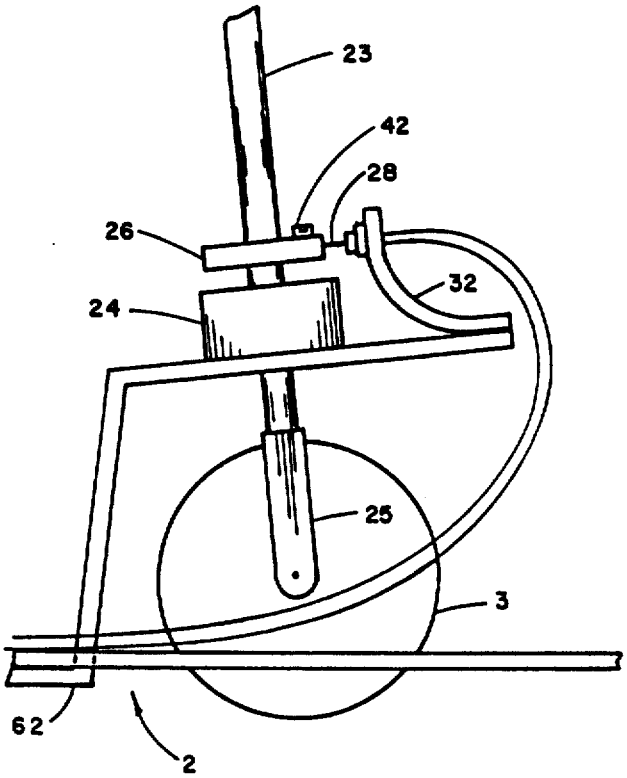
FIG. 6 is a side view of the front steering mechanism of the invention as it is attached to the chassis of the invention.

Connected to either end of drive shaft 20 are a right friction drive roller 21 and a left friction drive roller 22. When turning, rollers 21 and 22 maintain contact with rear wheels 4 and 5, respectively, and the vehicle 1 moves accordingly. One problem which arises concerning three-wheeled vehicles is that of the vehicle's ability to turn. When the front wheel 3 is turned and both rear wheels 4 and 5 are driving, the vehicle tends to move forward rather than to run in the direction urged by the front wheel 3. This situation is compounded by the increased driving power resulting from the gear reduction means 18 described above. Applicant has solved this problem by employing a unique, but simple, steering arrangement. As shown in FIGS. 5 and 6, a collar 26 is attached to handlebar post 23. A right steering cable 27 and a left steering cable 28 are fixedly connected to collar 26 at right and left cable clamps, 29 and 30, respectively. Right and left cable clamping screws 43 and 44 hold cables 27 and 28 in place in collar 26. Steering cables 27 and 28 are encased so as to allow relative movement between cable casings 31 and cables 27 and 28. Front bracket 32 serves to hold cable casings 31 in a stationary position to allow for relative movement. Thus, as the handlebar post 23 is turned, steering cables 27 and 28 will move accordingly.

Right and left steering cables 27 and 28 are connected to right and left clutch assemblies, 33 and 34, respectively. The right clutch assembly 33 comprises a right clutch bracket 35, a right clutch pin 36, a right clutch lever 37 and a right drive bearing 38. The left clutch assembly 34 similarly comprises a left clutch bracket 39, a left clutch pin 40, a left clutch lever 41 and a left drive bearing 41. The gearbox 18 is mounted on a pad 45 of resilient material, which is in turn mounted to the chassis 2, such that the gearbox 18, drive shaft 20 and friction drive rollers 21 and 22 are allowed to twist slightly as a unit upon the application of torque. When torque is released, the unit will return to its normal position. In normal position, right and left friction drive rollers 21 and 22 are held in contact with right and left rear wheels 4 and 5, respectively, by right drive spring 46 and left drive spring 47. Thus, should the operator desire to make a right turn, the handlebar 6 is turned clockwise, placing tension on the right steering cable 27, activating the right clutch lever 37, which urges the right drive bearing 38 and thus the right friction drive roller 21 away from the right rear wheel 4, causing the vehicle 1 to execute a right turn as the left rear wheel 5 continues to turn. When the handlebar 6 is straightened drive springs 46 and 47 urge both friction drive rollers 21 and 22 back into contact with rear wheels 4 and 5. The clutch assemblies 33 and 34 also allow for single motor operation, saving on costs, electrical circuitry and battery drain. Of course, separate motors 15 (with necessary gear reduction means 18) could be provided for each rear wheel 4 and 5. In this instance, turning could be controlled electronically by a joy stick control as described previously.

Of course, steering means 6 and clutch assemblies 33 and 34 may take various forms known in the art. For example, steering means 6 could comprise a joy stick type control for use by operators with limited hand movement. Such a control could also incorporate throttle 7 if necessary.

In order to lower the center of gravity of the vehicle 1, the rear axle 48 is elevated above the chassis 2 by means of right and left axle support brackets 49 and 50. This arrangement allows for increased stability of the vehicle 1. In order to provide increased assurance of stability, at least one rear caster 51 may be provided to prevent the possibility of the vehicle 1 rearing up upon rapid acceleration.

The vehicle 1 is provided with a front elevation sensing means 52 and a rear elevation sensing means 53, for sensing abrupt changes in surface elevation, such as steep drop-offs or steps. Range finding sonar circuits, of the type used in camera equipment, have proven successful for this application. Both elevation sensing means 52 and 53 are connected to circuit box 54 such that when a desired elevation difference is detected, power to the motor 15 is interrupted and the vehicle is stopped, until the vehicle 1 is removed from the danger area by a parent or other supervisory adult.

A remote switching means 55 is also provided to further enhance the safety features of the vehicle 1. Upon receipt of a given signal, the remote switching means 55 may be utilized to interrupt or reinstate power to the vehicle 1. A whistle-activated switch, such as that manufactured by Radio Shack, Catalog Number 277-1011 may be utilized for this purpose. Thus, if the vehicle 1 is seen moving toward a dangerous or undesired location, a parent need only blow a whistle to stop the vehicle 1. A second blast from a whistle is necessary to reinstate power to the vehicle 1. Of course, other types of remote switching apparatus may also be used.

Because of the low speed and high gear ratio of the vehicle 1, it tends to be unusually powerful. Therefore, in order to protect furniture and other fixtures as well as to provide increased safety, the vehicle 1 is provided with front and rear object detection means 56 and 57 which sense contact between the vehicle's front and rear bumpers 13 and 14, respectively, and foreign objects. The object detection means 56 and 57 are connected to the vehicle circuit box 54 such that upon contact with a foreign object, power will be interrupted and the vehicle will be stopped. In a preferred embodiment, front object detection means 56 is connected such that, when activated, the motor 15 will not operate in a forward direction. Likewise, the rear object detection means 57 is connected so as, when activated, to prevent operation in a reverse direction. Thus, the operator is able to extricate himself from difficulty without assistance under certain conditions.

Front and rear object detection means 56 and 57 may comprise various types of sensing devices. In one embodiment, shown in the Figures, front and rear bumpers 13 and 14 comprise inflated rubber tubing. Front and rear object detection means 56 and 57 comprise pressure sensitive switches, connected to bumpers 13 and 14. The switches 56 and 57 are responsive to the pressure increase caused by bumper contact with a foreign object. Of course, front and rear object detection means 56 and 57 could take other forms. For example, bumpers 13 and 14 could each contain a pair of electrically conductive strips which would normally be spaced apart, but would contact each other, closing a circuit, when in contact with a foreign object.

The vehicle 1 is powered by battery system 58. It is preferred that the battery system 58 includes a pair of six volts gel cell batteries. The gel cell batteries eliminate the danger of acid spills. This arrangement allows for one battery to be utilized for electronics circuitry, eliminating the need for a voltage regulator or voltage drop circuit. Both batteries would operate the twelve volt motor 15. Preferably, a one amp battery charger 59 is provided for overnight charging.

Figure 7:
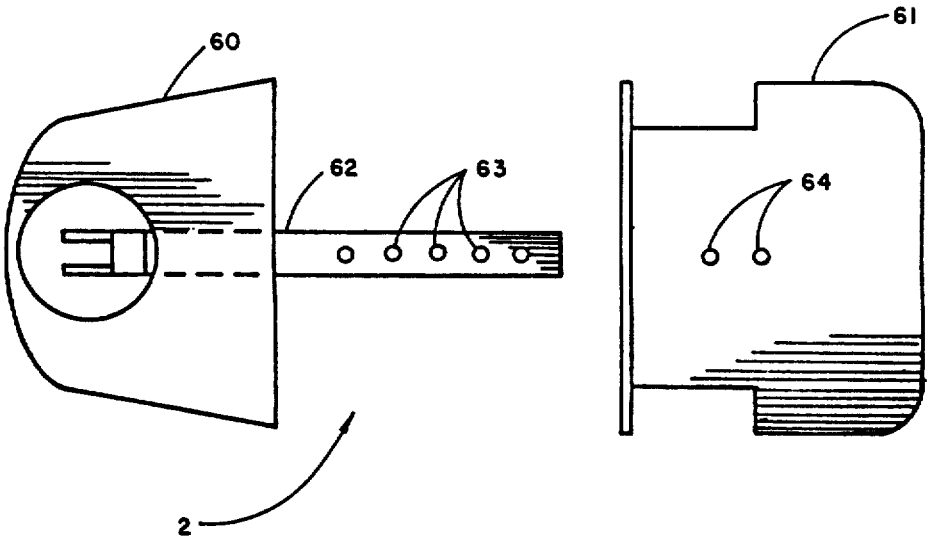
FIG. 7 is a top view of the adjustable chassis of a preferred embodiment of the invention.

The chassis 3 may be divided into a front section 60 and a rear section 61, as shown in FIG. 7. The front chassis section 60 is provided with a tongue 62, which has adjustment holes 63. Any two adjustment holes 63 may thus be aligned with mounting holes 64 in rear chassis section 61 and then bolted together to form a unitary chassis 2 which is adjustable in length. The chassis 2 is thereby made expandable such that, as a child grows, he does not outgrow the vehicle 1.

As can be seen, a motorized wheel chair is provided which enables physically or mentally challenged small children to safely and efficiently move about with a minimum of adult supervision. There are, of course, many alternate embodiments intended to be within the spirit and scope of this invention, as defined by the following claims.

I claim:

1. A motorized wheel chair for small children, comprising:

(a) a chassis;

(b) a front wheel, rotatably mounted on said chassis;

(c) a right rear wheel, rotatably mounted on said chassis;

(d) a left rear wheel, rotatably mounted on said chassis;

(e) a steering means, mounted on said chassis and connected to said front wheel, for turning said front wheel;

(f) a gear reduction means, for limiting the speed of said wheel chair, mounted on said chassis;

(g) a drive shaft, rotatably connected to said gear reduction means, said drive shaft having a left friction drive roller and a right friction drive roller fixedly attached thereto such that said left and right friction drive rollers are engageable with said left and right rear wheels, respectively;

(h) an electric motor, driveably connected to said gear reduction means such that for every revolution of said drive shaft, said motor will turn a greater number of revolutions;

(i) a throttle means, for controlling the speed of said motor, connected to said motor;

(j) a shift means, for controlling the direction of said motor, connected to said motor;

(k) a power source, mounted on said chassis and connected to said motor;

(l) a seat, mounted on said chassis; and (m) a clutch means, for selectively operating only said left rear wheel during a right turn and only said right rear wheel during a left turn, said clutch means being connectable between said steering means and said drive shaft said clutch means further comprising:

i. a right steering cable, connected at one end to said steering means, and at the other end to a right clutch lever;

ii. a right clutch lever pivotably attached to said chassis, attached to said right steering cable and attached to said drive shaft such that, during a right turn, said right friction drive roller is urged away from said right rear wheel;

iii. a left steering cable, connected at one end to said steering means, and at the other end to a left clutch lever; and iv. a left clutch lever pivotally attached to said chassis, attached to said left steering cable and attached to said drive shaft such that, during a left turn, said left friction drive roller is urged away from said left rear wheel; and wherein said gear reduction means is flexibly mounted to said chassis such that, upon an application of force, said gear reduction means may twist slightly on an axis generally perpendicular to said chassis and then return to its original position upon the release of said force.

*2. A motorized wheel chair for a small child comprising:*

*a chassis;*

*seat means supported by the chassis for supporting the child;*

*wheel means for supporting the chassis;*

*drive and steering means for selectively driving and steering the wheel means so that the wheel chair is caused to be moved along a selected path by the wheel means in response to actuation by the child;*

*detection means for sensing the presence of an object and for preventing the drive means from driving the wheel means in the direction of the sensed object; and*

*elevation sensing means for detecting a change in surface elevation greater than a selected elevation difference and for stopping the wheel chair upon detecting the selected elevation difference.*

*3. The motorized wheel chair of claim 2 wherein the detection means comprises:*

*front detection means attached to the wheel chair for sensing the presence of an object and for preventing the drive means from driving the wheel means in a forward direction.*

*4. The motorized wheel chair of claim 3 wherein the detection means further comprises:*

*rear detection means attached to the wheel chair for sensing the presence of an object and for preventing the drive means from driving the wheel means in a reverse direction.*

*5. The motorized wheel chair of claim 4 wherein the elevation sensing means comprises:*

*front elevation sensing means supported by a forward portion of the chassis for stopping the wheel chair upon detecting the selected elevation difference.*

*6. The motorized wheel chair of claim 5 wherein the elevation sensing means further comprises:*

*rear elevation sensing means supported by a rearward portion of the chassis for stopping the wheel chair upon detecting the selected elevation difference.*

*7. The motorized wheel chair of claim 2 wherein the drive and steering means comprises:*

*power means for selectively powering the wheel means.*

*8. The motorized wheel chair of claim 7 wherein the power means has at least one gel cell battery.*

*9. The motorized wheel chair of claim 8 wherein the wheel means comprises at least one pair of wheels and wherein the motorized wheel chair further comprises:*

*motor means connected to the wheel means for selectively rotating the wheels when energized by the battery.*

*10. The motorized wheel chair of claim 9 further comprising:*

*charge means supported by the chassis for charging the battery.*

*11. The motorized wheel chair of claim 2 further comprising:*

*remote switching means for actuating the drive and steering means from a remote locate.*

* * * * *